US008214849B2

(12) United States Patent
Cooper

(10) Patent No.: US 8,214,849 B2
(45) Date of Patent: Jul. 3, 2012

(54) SYSTEM FOR LOADING DEVICE-SPECIFIC CODE AND METHOD THEREOF

(75) Inventor: Neil A. Cooper, Newmarket (CA)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1284 days.

(21) Appl. No.: 09/904,989

(22) Filed: Jul. 13, 2001

(65) Prior Publication Data

US 2003/0014561 A1    Jan. 16, 2003

(51) Int. Cl.
  *G06F 3/00* (2006.01)
  *G06F 9/44* (2006.01)
  *G06F 9/46* (2006.01)
  *G06F 13/00* (2006.01)
(52) U.S. Cl. ....................... 719/323; 719/327
(58) Field of Classification Search .................. 719/327, 719/323, 321, 322, 324
  See application file for complete search history.

(56) References Cited

U.S. PATENT DOCUMENTS

| | | | | |
|---|---|---|---|---|
| 4,649,479 A * | 3/1987 | Advani et al. | | 718/1 |
| 5,136,709 A * | 8/1992 | Shirakabe et al. | | 717/164 |
| 5,339,432 A * | 8/1994 | Crick | | 713/1 |
| 5,459,867 A * | 10/1995 | Adams et al. | | 719/321 |
| 5,465,364 A * | 11/1995 | Lathrop et al. | | 719/321 |
| 5,491,813 A * | 2/1996 | Bondy et al. | | 719/323 |
| 5,581,766 A * | 12/1996 | Spurlock | | 713/2 |
| 5,586,324 A * | 12/1996 | Sato et al. | | 713/2 |
| 5,613,123 A * | 3/1997 | Tsang et al. | | 713/1 |
| 5,701,476 A * | 12/1997 | Fenger | | 713/2 |
| 5,752,032 A * | 5/1998 | Keller et al. | | 719/311 |
| 5,794,032 A * | 8/1998 | Leyda | | 713/2 |
| 5,802,365 A * | 9/1998 | Kathail et al. | | 719/321 |
| 5,867,730 A * | 2/1999 | Leyda | | 710/10 |
| 5,896,141 A * | 4/1999 | Blaho et al. | | 345/541 |
| 6,148,346 A * | 11/2000 | Hanson | | 719/321 |
| 6,216,188 B1 * | 4/2001 | Endo et al. | | 710/302 |
| 6,226,788 B1 * | 5/2001 | Schoening et al. | | 717/107 |
| 6,518,976 B1 * | 2/2003 | Curtis et al. | | 345/621 |

* cited by examiner

*Primary Examiner* — Diem Cao

(57) ABSTRACT

A system and methods are provided for loading device-specific functions into a device driver. Upon boot-up an operating system initiates a device driver to be loaded into kernel mode memory. Functions that are device independent are loaded into memory and form a first portion of the device driver. An identifier associated with a particular device being used is received. The device identifier is compared to a table of supported devices to identify a device-specific image from a plurality of executable image files. The identified device-specific image is then loaded to form a second portion of the device driver in kernel mode memory.

29 Claims, 4 Drawing Sheets

SYSTEM FOR LOADING DEVICE-SPECIFIC CODE AND METHOD THEREOF

FIELD OF THE DISCLOSURE

The present invention relates generally to display drivers and more particularly to loading display driver code.

BACKGROUND

Within an information handling system, software and hardware generally work together. A host processor is used to process commands from software applications. An operating system handles tasks among various software applications and hardware components of the information handling system. To allow an operating system to best communicate with peripheral hardware devices, software drivers are generally provided. The software drivers include functions that the operating system, and system applications, may call. These functions are generally used to generate specific commands for the peripheral hardware, allowing the peripheral hardware to handle processes for the information handling system.

New system drivers are generally needed to match new hardware revisions. As hardware devices, such as display adapters, are upgraded, several versions of the same device may exist. While some driver functions may be used independent of the hardware version being used, other functions are device-specific. To make full use of upgraded features of a new hardware peripheral, some functions are made to specifically make use of the new features. Such device-specific drivers improve system performance using the improved hardware device and user experience.

While it is often desired to make full use of a new hardware peripheral's capabilities, it becomes difficult for a user to upgrade system drivers when switching between different versions of a particular hardware device. To match the specifications of each hardware version, different device drivers may be provided for each version of a hardware device. When switching between hardware devices with different drivers, a driver associated with a removed device must be removed from the system and a new driver must be installed to match the new device.

To simplify device installation, a single device driver may be made to support a variety of device versions. Functions that are device-independent are isolated and used for all versions of the device. Device-specific functions for every supported device version are provided in the driver as separate functions. Once the driver is loaded by the operating system, only functions that are device independent or specific to the device being used are called. While such a driver may support a variety of hardware device versions, the driver loaded into main memory becomes large. Furthermore, as the driver supports more hardware device versions, more of the driver functions become dead code that are loaded into memory but never used, due to association with an unused hardware device. Such a driver also becomes difficult to build, to debug, and to support. From the above discussion, it is apparent that an improved method of supporting multiple devices would be useful.

BRIEF DESCRIPTION OF THE DRAWINGS

Specific embodiments of the present invention are shown and described in the drawings presented herein. Various objects, advantages, features and characteristics of the present invention, as well as methods, operations and functions of related elements of structure, and the combination of parts and economies of manufacture, will become apparent upon consideration of the following description and claims with reference to the accompanying drawings, all of which form apart of this specification, and wherein:

DETAILED DESCRIPTION OF THE FIGURES

At least one embodiment of the present invention provides for a method of generating a device-specific display driver in kernel mode memory. The method includes loading device-independent driver code into kernel mode memory. The device independent driver code is used to form a first portion of a display driver. The method includes receiving a device identifier. The device identifier indicates a current version of a particular device being used. The method also includes identifying a particular device-specific driver portion from a plurality of driver portions. The driver portions may include executable image files. The particular device-specific driver portion is identified using the device identifier. The method further includes loading the particular device-specific driver portion into kernel mode memory. The device-specific driver portion is used to form a second portion of the display driver.

Figure 1:
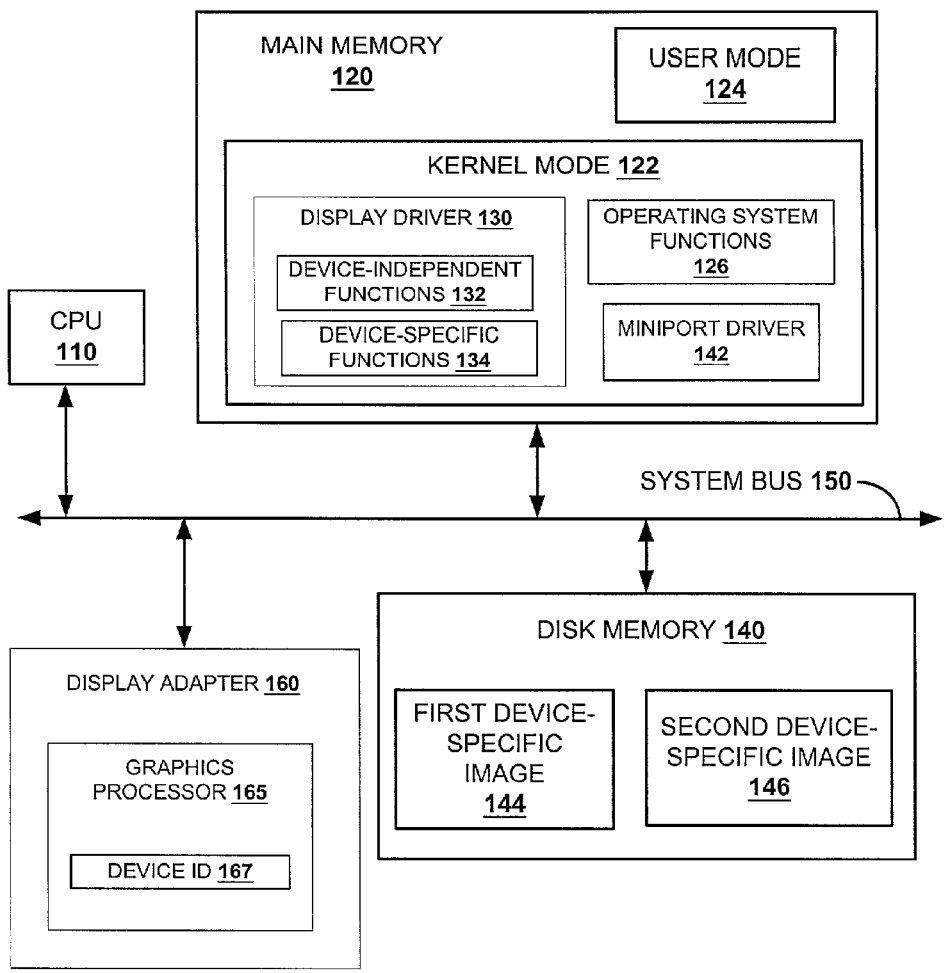
FIG. 1 is a block diagram illustrating a system for loading device-specific functions into a system driver, according to one embodiment of the present invention.

Referring now to FIG. 1, a block diagram illustrating a system for loading device-specific functions is shown and referenced generally as system 100, according to one embodiment of the present invention. A display driver 130 is stored in main memory 120 of system 100. Device independent functions 132 are loaded into a first portion of display driver 130 regardless of the hardware device being used. Device-specific functions 134 are loaded into a second portion of display driver 130 from a device-specific driver portion known as an executable image file, such as first device specific image 144, associated with a particular hardware device, such as display adapter 160.

In one embodiment, system 100 includes a general-purpose information handling system that includes a data processor, central processing unit (CPU) 110. CPU 110 handles processes from various system components, such as software applications (not shown) or hardware devices, such as display adapter 160. Data is passed to and from CPU 110 through a system bus 150. In one embodiment, system bus 150 includes a peripheral component interconnect (PCI) bus. In one embodiment, system components, such as CPU 110, main memory 120, disk memory 140 and display adapter 160, are linked through system bus 150. Data passed among the system components is passed through system bus 150. Peripheral hardware devices, such as display adapter 160 may be added to system 100 through connections with system bus 150.

In one embodiment, display adapter 160 is connected to system 100. Display adapter 160 includes a graphics processor 165 for handling graphics and video processing within system 100. In one embodiment, display adapter 160 is used for two-dimensional and three-dimensional graphics processing and rendering. In one embodiment, graphics processor 165 represents one particular version of a variety of graphics processors. Graphics processor 165 handles various graphics processing functions. Some functions, such as two-dimensional graphics processes, are capable of being processed by a variety of graphics processors, including graphics processor 165; however, some functions are device-specific. For example, some three-dimensional graphics processing functions, such as direct 3D (D3D) or direct draw (DD) functions are supported by particular graphics processors and may only be processed correctly through the particular graphics processor, such as graphics processor 165. A display driver 130 is constructed in main memory 120 to provide both device-independent functions 132 and device-specific functions 134 for system 100 to use with graphics processor 165 of display adapter 160.

In one embodiment, during a boot-up of system 100, an operating system (not shown) loads essential system drivers and functions in system memory, such as main memory 120. In one embodiment, a miniport driver 142 is loaded into kernel mode memory 122, through system registry information (not shown) stored in disk memory 140. Miniport driver 142 is used to load and initialize a display driver 130, associated with display adapter 160, in kernel mode memory 122 of main memory 120. Some operating systems, such as the Unix operating system or Windows 2000 operating system, partition main memory 120 into different memory portions or memory modes. The different memory modes are associated with different levels of access provided to functions located within the memory portions.

In one embodiment, the level of memory that provides the most access of system 100 is known as ring0 memory, or kernel mode memory 122. Kernel mode memory 122 is used to store operations or functions that have the most access to hardware processes of system 100. An application mode memory or user mode memory 124 provides less access, than kernel mode memory 122, to general application functions stored therein. After functions are stored in kernel mode memory 122, the stored functions are allowed to run in a protected mode of memory and provide services to other functions in user mode memory 124. Kernel mode memory 122 protects and isolates hardware, such as graphics processor 165, from applications running functions in user mode memory 124. In one embodiment of the present invention, disk memory 140 includes hard drive memory. Disk memory 140 may also include floppy disk memory, compact disk data, or other form of memory media. Disk memory 140 may also include other memory devices, such as RAM memory devices, without departing from the scope of the present invention.

In one embodiment, the kernel mode memory 122 is composed of four sub-systems, an executive sub-system, a hardware abstraction layer (HAL), a device driver sub-system, and a microkernel. The executive sub-system performs input/output (I/O) and object management services. The executive sub-system is also responsible for security I/O and is broken into system services accessible by functions of user mode memory 124 and internal services accessible only by other executive sub-system functions. The executive subsystem includes components such as an I/O manager, a virtual memory manager, a plug and play manager, an object manager, and a process manager. The executive sub-subsystem may also include a graphical device interface (GDI) for managing windows display systems.

The device driver subsystem translates I/O requests into hardware functions, such as display driver 130 and miniport driver 142. In one embodiment, device drivers are also separated into various levels. A high-level device driver, such as file allocation table drivers and other file system drivers, require support from lower-level drivers, such as intermediate- and low-level drivers. An intermediate-level driver, such as display driver 130 or miniport driver 142, provides support for high-level drivers and requires support from lower level drivers. Low-level drivers don't require support from other drivers and generally include drivers to maintain function to control physical peripheral devices, such as system bus 150. The microkernel is used to translate information, such as I/O requests, to the processor, CPU 110. The HAL is used to manage translation services for I/O functions, interrupt controllers, and processor communications functions.

In one embodiment, kernel mode memory 122 includes display driver 130 for handling functions and services for display adapter 130, miniport driver 142 and operating system functions 126. Upon boot-up, the operating system may be used to load miniport driver 142. Miniport driver 142 may be used to initialize display driver 130 in kernel mode memory 122. Miniport driver 142 may also load various device-independent functions 132 in display driver 130. As previously discussed, device-independent functions 132 include functions, such as two-dimensional graphics processes, that are capable of being processed on a variety of graphics processors, different from graphics processor 165.

Upon boot-up, device-specific functions 134 may also be loaded into display driver 130 in kernel mode memory 122. The device-specific functions 134 include functions that are specific to graphics processor 165. In one embodiment, system 100 queries display adapter 160 to determine a device identifier (ID) 167 associated with graphics processor 165. The device ID 167 may include a graphics processor identifier, indicating a particular version of graphics processor 165. The device ID 167 may also include an application-specific integrated circuit (ASIC) identifier associated with graphics processor 165. The device ID 167 may then be compared to a table (not shown) of supported graphics processors to select a device-specific driver portion known as an executable image file, such as first device-specific image 144, from a collection of image files, such as device-specific images 144 and 146, stored in disk memory 140. For example, in one embodiment, first device-specific image 144 matches device ID 167. Accordingly, device-specific functions 134 from first device-specific image 144 are loaded into display driver 130. In one embodiment, a function capable of moving a block of executable code into kernel mode memory 122 is called to load first device-specific image 144 into kernel mode memory 122. It should be noted that the function used may be dependent on a particular operating system being run on system 100. In one embodiment, a Windows 2000 or Windows XP operating system function, EngLoadImage is used to load first device-specific image 144. In one embodiment, EngLoadImage is called as follows:

EngLoadImage (IN LPWSTR pwszDriver <>);

The parameter "pwszDriver" points to a null-terminated string which names the file containing an executable image to be loaded, such as first device-specific image 144. If the call to EngLoadImage is successful, a handle to the image that was loaded is returned. EngLoadImage allows an executable image, such as first device-specific image 144 or second device-specific image 146 to be loaded into kernel mode memory 122. In one embodiment, once EngLoadImage returns a handle to first device-specific image 144, another function is called to find addresses associated with the beginnings of procedures or functions within the loaded executable image. In one embodiment, the function EngFindImageProcAddress is used to return pointers to addresses of particular functions found within first device-specific image 144. EngFindImageProcAddress may be called as follows:

```
EngFindImageProcAddress (IN HANDLE hModule
    <>, IN LPSTR lpProcName <>);
```

The parameter "hModule" is a handle to the image in which a desired function may be found. The handle may be obtained through EngLoadImage, as previously described. The parameter "lpProcName" is a pointer to a string that specifies the desired function. If successful, the function EngFindImageProcAddress returns a base address of the desired function's executable code. Once the pointers of the desired functions of first device-specific image 144 have been loaded, system 100 may use the functions to process device-specific operations through graphics processor 165. In one embodiment, once display adapter 160 or graphics processor 165 is switched with an alternate version of a graphics processor, a new device-specific image, such as second device-specific image 146, will be matched to the new graphics processor version being used. Second device-specific image 146 may then be loaded and used to generate a new set of device-specific functions, associated with the new graphics processor version being used.

It should be noted that device-specific images 144 and 146 may need to be named as dynamic linked library (DLL) files. While the device-specific images 144 and 146 are not truly DLL files, the naming convention may need to be kept for the device-specific image files 144 and 146 to be understood by the EngLoadImage function described above. In one embodiment, first device-specific image 144 and second device-specific image 146 are part of a greater plurality of device-specific images (not shown). Furthermore, while only first device-specific image 144 and second device-specific image 146 are shown, it should be appreciated that more device-specific images may be included for supporting all desired versions of a device, such as graphics processor 165.

Figure 2:
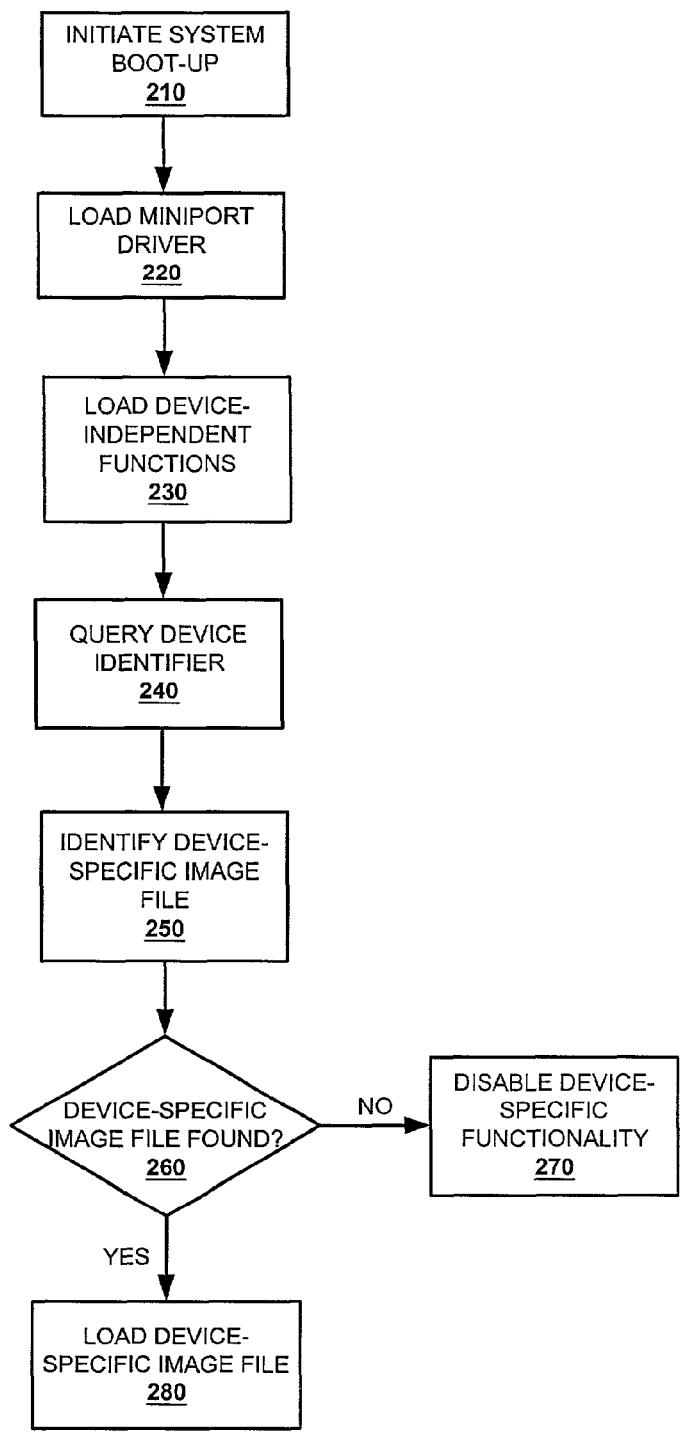
FIG. 2 is a flow diagram illustrating a method of identifying and loading a device-specific image file into a system driver, according to one embodiment of the present invention.

Referring now to FIG. 2, a flow diagram describing a method of loading a device-specific driver portion is shown, according to one embodiment of the present invention. A display driver is initialized and loaded into kernel mode memory within an information handling system. A particular peripheral device, such as a display adapter or graphics chip, is identified and matched to a driver portion, such as an executable image file. The driver portion is loaded by the information handling system to allow device-specific functions associated with the peripheral device to be loaded within the display driver. The peripheral device may then be used to handle specific processes for the information handling system.

In step 210, a system boot-up for the information handling system is initiated. The boot-up may be initiated by a user or by an operating system in response to a need to re-initiate system drivers. The boot-up may also be part of the information handling system being recently turned on. During a boot-up sequence, an operating system associated with the information handling system begins to load device drivers into memory. The device drivers are drivers used to handle various functions for peripheral devices. In one embodiment, a display adapter connected to the information handling system includes a graphics chip of a particular version.

In step 220, a miniport driver associated with the display adapter is loaded by the operating system. The miniport driver may be initialized through registry settings. In one embodiment, the miniport driver is used to initialize a display driver that is loaded into kernel mode memory of the information handling system. In step 230, the miniport driver is used to load device-independent functions into the display driver in kernel mode memory. The device-independent functions include functions that are capable of being processed by the system despite the particular version of the graphics processor being used by the display adapter.

In step 240, the information handling system queries the display adapter to determine the version of the graphics processor being used. The query may include a function understood by the graphics processor for providing a device identifier. In one embodiment, a device identifier associated with the graphics processor is returned and used to determine the version. In step 250, a device-specific executable file is identified as being associated with the graphics controller. In one embodiment, the device identifier returned from step 240 is compared to a table of supported devices. Once the device identifier is matched in the table, a name of an executable image file associated with the graphics processor is identified. In step 260, it is determined if the device-specific image file identified in step 250 exists in the information handling system. In step 260, if the device-specific image file is not found, the device-specific functionality provided by the image file is disabled, as in step 270. For example, D3D or DD commands may be disabled in the information handling system if the appropriate image file is not found. It should be noted that while an available image file may be provided in its place, the image file may cause the information handling system to run with reduced performance.

In step 260, if the identified device-specific image file is found, the information handling system loads the desired device-specific image file, as in step 280. System function calls may be made to load the identified image file. As previously discussed, in one embodiment, the image file is loaded using an EngLoadImage command, as identified and described according to the Microsoft Driver Development Kit. If the desired image file does not exist, the EngLoadImage command returns a null value. It should be noted that while an image file was identified and found, the image file itself may be of an incorrect version, as will be discussed in reference to FIG. 3. Furthermore, while the image file has been loaded, the functions within the image file are not ready to be called. In one embodiment, addresses associated with the functions must be determined, as will be discussed in reference to FIG. 3.

Figure 3:
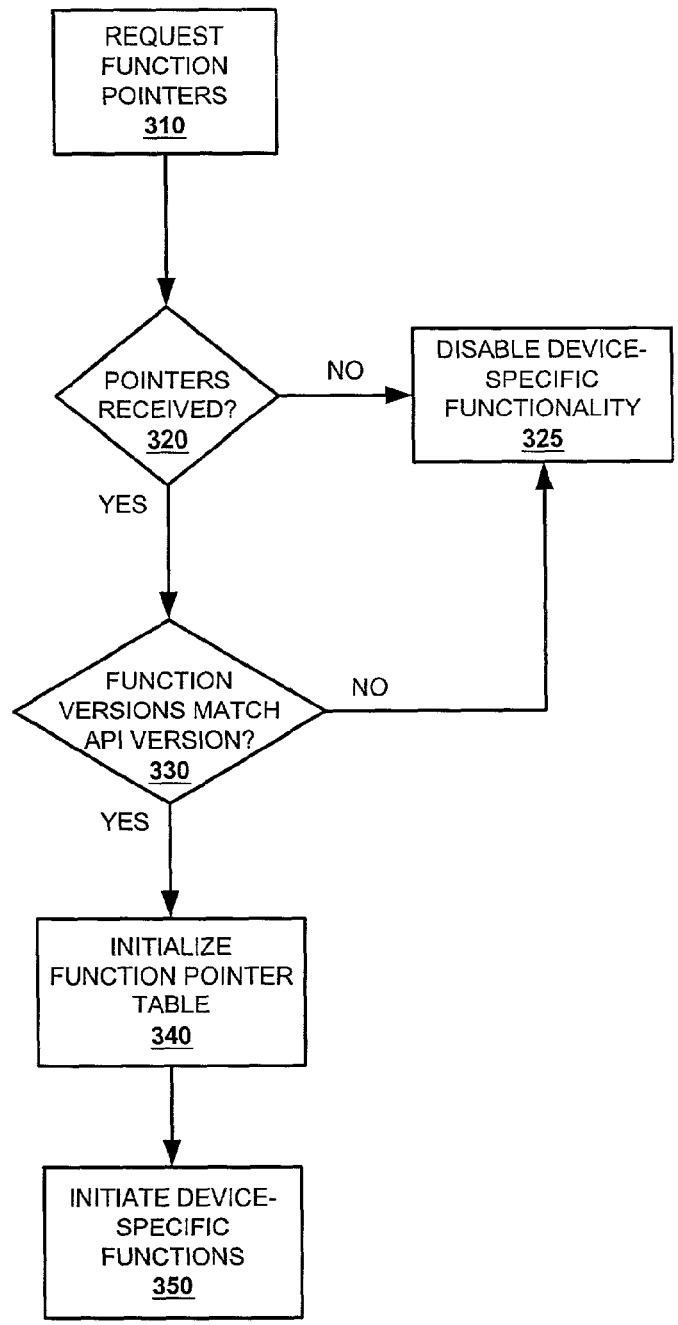
FIG. 3 is a flow diagram illustrating a method of identifying device-specific functions associated with a device driver, according to one embodiment of the present invention.

Referring now to FIG. 3, a flow diagram describing a method of processing functions associated with a loaded image file is shown, according to one embodiment of the present invention. A particular image file is identified from a collection of image files as being associated with a particular device, such as a particular graphics processor. Once the image file is identified, it must be analyzed to ensure the image file is valid.

In step 310, pointers associated with the loaded image file are requested. In one embodiment, the function pointers are requested using an operating system function call, such as the EngFindImageProcAddress command provided through the Microsoft Driver Development kit. In one embodiment, if the command called is successful, a pointer to the requested function within the loaded image file is returned. In step 320, it is determined if the pointers to the desired functions were returned. In one embodiment, the command returns a null value if the address pointers were not found. In step 320, if no pointers were received, the device-specific functionality associated with the desired functions is disabled, as in step 325. For example, if pointers associated with a D3D function were not returned, D3D functionality is disabled. In one embodiment, all functions associated with the image file are disabled.

In step 320, if the pointers to the addresses of the desired functions are returned, the system continues to process the commands, as in step 330. In step 330, the versions of the functions are compared to versions expected by an application program interface (API) running in the information handling system. A function may be called to query the current API for a version identifier. In one embodiment, the function called to determine the API version is not allowed to change for the life of a driver associated with the loaded image. An API is an interface between application functions found in user mode memory and functions or services in kernel mode memory. The API allows applications to access operating system functions and other services, such as the device-specific functions. In step 330, if the versions of the device-specific functions do not match the function versions expected by the API, the functions and the functionality associated with the functions is disabled, as in step 325.

In step 330, if the function versions match the expected versions, a function pointer table is initialized using the returned function address pointers, as in step 340. The pointers indicate addresses for running executable code associated with the device-specific functions. In step 350, the device-specific functions are initiated as needed. When needed, the functions may be called by executing the code found at the addresses provided through the table initiated through step 340.

Figure 4:
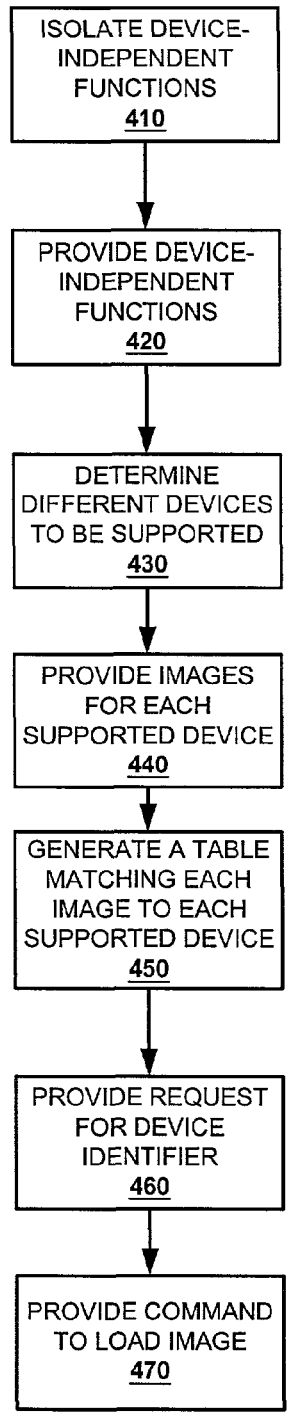
FIG. 4 is a flow diagram illustrating a method of providing a device-independent driver, according to one embodiment of the present invention.

Referring now to FIG. 4, a flow diagram illustrating steps for providing a device-independent driver is shown, according to one embodiment of the present invention. Portions of a computer readable medium may be used to provide support for generating a device-independent driver. Two portions of a device driver are provided through the computer readable medium. Device-independent functions form a first portion of the device driver and device-specific functions form a second portion of the device driver. The device-independent functions may be provided for loading into a system regardless of the particular device being used. Images for the device-specific functions are provided through the computer readable medium to allow the device-specific functions to be loaded separately, dependent on the particular device being used. The computer readable medium may include memory storage devices such as a computer disk, a compact disc (CD), a digital versatile disk (DVD), or a computer hard drive.

In step 410, device independent functions are isolated. Various sets of device driver functions for different devices are compared to identify functions that may be used by all the devices that will be supported. It should be noted that some functions may need to be altered slightly to be device-independent. Functions that are difficult to be made device-independent should be left alone and identified as being device-specific functions. In step 420, the device-independent functions are provided together. The device independent functions may be combined to form a single file or image. The device-independent functions will be loaded upon a system boot-up regardless of the device being used.

In step 430, the different devices to be supported by the driver are determined. All versions of the devices to be supported should be considered. A list of devices to be supported by the device driver may then be generated. It should be noted that future versions of a device driver being used may add extra devices to the list of supported devices, allowing the device driver to continue to support new devices. In step 440, images for each of the supported devices determined in step 430 are generated. A unique image may be constructed for each supported device. Alternatively, an image may support one or more devices of a greater plurality of devices. The image should include most of the functions that were found to be device-specific for the particular device supported by the image. In one embodiment, the images must be provided as DLL files to satisfy an EngLoadImage function naming convention. In step 450, a table is generated. The table provides a link to match each image generated in step 440 to the devices supported by the image. In one embodiment, a device identifier is used to identify the supported devices within the table.

In step 460, a system command is provided to request a device identifier during system boot-up. The device identifier is to indicate which device or device version is currently being used by the system. The device identifier may include an ASIC identifier to indicate the device being used. In step 470, a system command to load an image is provided. The image to load is determined by comparing a device identifier returned from the request in step 460. The device identifier is compared to the table generated in step 450 to identify an associated image. In one embodiment the command includes the Microsoft command EngLoadImage to load the image and the Microsoft command EngFindImageProcAddress to generate pointers to functions within the loaded image. When processed by a system, the driver generated through the steps described in FIG. 4 allows a device-specific driver to be loaded into kernel mode memory.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that the system described herein has the advantage of selectively loading only functions which are associated with a particular device in a driver within main memory.

In the preceding detailed description of the embodiments, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:
   loading device-independent driver code into kernel mode memory, wherein the device-independent driver code forms a first portion of a display driver;

requesting a device identifier after loading the device-independent driver code into kernel mode memory, wherein the requested device identifier is to identify a particular device;

receiving the requested device identifier associated with a particular device;

identifying a particular device-specific driver portion from a plurality of driver portions associated with the device identifier based on a comparison of versions associated with functions of the device-specific driver portion to versions expected through an application program interface; and loading the particular device-specific driver portion into kernel mode memory, wherein the device-specific driver portion forms a second portion of the display driver;

wherein loading the device-specific driver portion includes calling a function to load a block of executable code in kernel mode memory; and wherein the function includes EngLoadImage function.

2. The method as in claim 1, wherein the device identifier includes an application-specific integrated circuit identifier.

3. The method as in claim 2, wherein the device identifier includes a graphics chip identifier.

4. The method as in claim 1, wherein the device-specific driver portion includes direct draw functions.

5. The method as in claim 1, wherein the device specific driver portion includes direct 3D functions.

6. The method as in claim 1, further including identifying addresses of functions associated with the device-specific driver portion through a EngFindImageProcAddress function, after loading the device-specific driver portion into memory.

7. The method as in claim 1, wherein the device-independent driver code includes two-dimensional graphics functions.

8. The method as in claim 1, wherein identifying the device-specific driver portion includes locating a name associated with the device-specific driver portion in a table using the device identifier.

9. A method comprising:

providing a set of device-independent functions, wherein the device-independent functions are capable of manipulating a processor to support a plurality of different display devices;

providing a plurality of device-specific driver portions, wherein each device-specific driver portion of the plurality of device-specific driver portions include functions capable of manipulating a processor to support only a portion of the plurality of different display devices;

providing a first function to manipulate a processor to load one or more device-independent functions of the set of device-independent functions into kernel mode memory;

providing a second function to manipulate a processor to request for a device identifier after the one or more device-independent functions are loaded into kernel mode memory, wherein the device identifier is capable of identifying a particular display device of the plurality of different display devices; and providing a table linking device identifiers to individual device-specific driver portions of the plurality of device-specific driver portions;

providing a third function to manipulate a processor to load a particular device-specific driver portion into kernel mode memory based on the table and the device identifier, wherein the particular device-specific driver portion is associated with the particular display device of the plurality of different display devices; and wherein the third function includes a call to an EngLoadImage function.

10. The method as in claim 9, wherein the device-independent functions include two-dimensional graphics processing functions.

11. The method as in claim 9, further including providing a fourth function to determine addresses associated with functions of the particular device-specific driver portion, after providing the third function.

12. The method as in claim 11, wherein the fourth function includes a call to an EngFindImageProcAddress function.

13. The method as in claim 9, wherein functions of the plurality of device-specific driver portions include direct 3D functions.

14. The method as in claim 9, wherein functions of the plurality of device-specific driver portions include direct draw functions.

15. The method as in claim 9, wherein the device identifier includes a graphics processor identifier.

16. The method as in claim 9, wherein the device identifier includes an application specific integrated circuit identifier.

17. A system comprising:

a data processor having an interface;

memory having an interface coupled to the interface of the data processor, said memory having:

a kernel mode memory including:

a miniport driver to initialize a display driver to be accessed as a portion of said kernel mode memory;

load device-independent driver code into said display driver in said kernel mode memory;

determine a device identifier associated with a display adapter;

identify device-specific driver code from a plurality of executable images, wherein the device-specific driver code is associated with said device identifier;

load a portion of device-specific driver code for access as a portion of said display driver;

said display driver, wherein said display driver includes:

said device-independent driver code;

said device-specific driver code;

said plurality of executable images;

display adapter having:

an interface coupled to the interface of the data processor; and said device identifier.

18. The system as in claim 17, wherein the device identifier includes an application specific integrated circuit identifier.

19. The system as in claim 17, wherein said display adapter includes a graphics processor.

20. The system as in claim 19, wherein the device identifier includes a graphics processor identifier.

21. The system as in claim 17, wherein said device-independent driver code includes two-dimensional graphics functions.

22. The system as in claim 17, wherein the device-specific driver code includes direct 3D functions.

23. The system as in claim 17, wherein the device-specific driver code includes direct draw functions.

24. The system as in claim 17, wherein individual executable images of the plurality of executable images include functions unique to a particular device.

25. A non-transitory computer readable medium tangibly embodying a plurality of programs of instructions, the plurality of programs including:

a set of device-independent functions to manipulate a processor to support a plurality of different display devices;

a plurality of device-specific driver portions, wherein each device-specific driver portion of the plurality of device-specific driver portions includes functions to manipulate a processor to support only a portion of the plurality of different display devices;

a first function to manipulate a processor to load one or more device-independent functions of the set of device-independent functions into kernel mode memory;

a second function to manipulate a processor to request a device identifier after the one or more device-independent functions of the set of device-independent functions into kernel mode memory;

a third function to manipulate a processor to identify a particular device-specific driver by locating a name associated with the particular device-specific driver portion in a table using the device identifier; and a fourth function to manipulate a processor to load the particular device-specific driver portion into kernel mode memory;

wherein the second function includes a call to an EngLoadImage function.

26. The computer readable medium as in claim 25, further including a third function to determine addresses associated with functions of the particular device-specific driver portion.

27. The computer readable medium as in claim 26, wherein the third function includes a function call to an EngFindImageProcAddress function.

28. The computer readable medium as in claim 25, wherein the device identifier includes an application specific integrated circuit identifier.

29. The computer readable medium as in claim 25, further including a table linking device identifiers to individual device-specific driver portions of the plurality of device-specific driver portions.

* * * * *